United States Patent [19]
Uehara et al.

[11] Patent Number: 5,588,297
[45] Date of Patent: Dec. 31, 1996

[54] THERMAL POWER GENERATOR

[75] Inventors: Haruo Uehara; Yasuyuki Ikegami, both of Saga, Japan

[73] Assignee: Saga University, Saga, Japan

[21] Appl. No.: 255,968

[22] Filed: Jun. 7, 1994

[30] Foreign Application Priority Data

Sep. 22, 1993 [JP] Japan .................... 5-236432

[51] Int. Cl.$^6$ .................... F01K 25/06
[52] U.S. Cl. .................... 60/673; 60/649
[58] Field of Search .................... 60/671, 649, 651, 60/673

[56] References Cited

U.S. PATENT DOCUMENTS

| | | | |
|---|---|---|---|
| 4,573,321 | 3/1986 | Knaebel | 60/673 |
| 4,691,523 | 9/1987 | Rosado | 60/649 |
| 4,756,162 | 7/1988 | Dayan | 60/673 |
| 5,007,240 | 4/1991 | Ishida et al. | 60/673 |
| 5,029,444 | 7/1991 | Kalina | 60/673 |

FOREIGN PATENT DOCUMENTS

| | | |
|---|---|---|
| 162579 | 11/1985 | European Pat. Off. . |
| 181275 | 5/1986 | European Pat. Off. . |
| 2-1989 | 1/1990 | Japan . |
| 2-1990 | 1/1990 | Japan . |
| WO91/07573 | 5/1991 | WIPO . |

Primary Examiner—Leonard E. Heyman
Attorney, Agent, or Firm—Spencer & Frank

[57] ABSTRACT

A thermal power generator includes a high heat source pump, and cold working fluid pumps. An evaporator heat exchanges a high heat source fluid and a warmed working fluid. A liquid-vapor separator is connected to the evaporator. A first stage turbine is connected to the liquid-vapor separator. A second stage turbine is connected to the first stage turbine. A heater is connected to the first stage turbine, and receives remaining vapor working fluid, and the cold-working fluid to heat exchange the fluids. A tank stores and mixes the working fluids discharged from the heater, and supplies the stored working fluid to the first cold working fluid pump. A regenerator receives the liquid working fluid from the separator, and the cold working fluid, and forms a regenerated working fluid, and a warmed working fluid discharged to the evaporator. An absorber is connected to the second stage turbine and the regenerator. A reducing valve is located between the absorber and regenerator. A low heat source pump supplies a low heat source fluid to a main condensation tank, to perform a heat exchange to recondense the vapor working fluid. An auxiliary condensation tank receives an absorbed working fluid, the recondensed working fluid, and the low heat source fluid. A storage tank is connected to the auxiliary condensation tank. The cold-working fluid is fed from the storage tank to the heater, regenerator and evaporator, respectively.

6 Claims, 1 Drawing Sheet

THERMAL POWER GENERATOR

BACKGROUND OF THE INVENTION

1. Field of the Invention

The present invention relates to a thermal power generator for generating electric power by utilizing a high heat source and a low heat source, and particularly improves an electric power generating effect by providing an evaporator, vapor-liquid separator, absorber and regenerator, increases thermal efficiency of the evaporator and condenser, and reduces the costs of constructing the apparatus.

2. Related Art Statement

An oceanic thermal power generator of this kind for obtaining electric power by utilizing a temperature difference between warm sea water at high temperature in an oceanic surface layer and cold sea water at low temperature in an oceanic deep layer has hitherto been constructed, by using an evaporator, a turbine connected to a generator, and a condenser as a main apparatus. Warm sea water is circulated through an evaporator, and cold sea water is circulated through a condenser. A working fluid is evaporated using a temperature difference between the warm and cold sea water, and condensed. A turbine is driven in this period to generate power. However, the warm sea water circulated through the evaporator is extracted from a surface layer of the ocean having a temperature as high as 15°–33° C., and plankton, spawn and dirt floated therein adhere to a heat transfer surface of the main apparatus, so that the thermal conductivity efficiency is disadvantageously lowered. As a general method of preventing stains for removing such disadvantage, there is a method of preventing planktonic stains by injecting chlorine into circulating sea water, or providing an electrode in circulated sea water and generating chloride by electrolysis. There is also a method of preventing any other stains by circulating sponge balls, brush and the like with circulated sea water through the main apparatus. However, since the thermal exchange temperature difference is small in oceanic thermal power generation, the amount of needed circulated sea water is enormous. As a result, such general methods of preventing stains produces problems such as high cost, environmental pollution and the like. That is, the method of using sponge balls, brush and the like requires many sponge balls and brushes, and results in a lowering of net output by increasing power consumption based on an increase of circulated resistance, and further results in an increase of the cost of the equipment and an increase of a power generation unit cost.

Therefore, the prior oceanic thermal power generator is not applicable to a general method of preventing stains and is disadvantageously high in cost.

The present inventors have invented an oceanic thermal power generator (Japanese Patent Application Publication No. 1,989/92) and a control device in oceanic thermal power generation (Japanese Patent Application Publication No. 1,990/92).

In the oceanic thermal power generator of this kind, a Rankine cycle or regenerating cycle is formed by utilizing the so-called single component medium having high purity, such as ammonia, flon, water and the like as a working fluid.

In the known Rankine cycle, thermal efficiency is small, so that the areas of an evaporator and a condenser become enormous, and generating cost becomes expensive. In order to eliminate this disadvantage, a cycle utilizing a mixture of ammonia and water as a working fluid has been proposed. This is called "calina cycle". In this calina cycle, thermal efficiency becomes high as compared with the conventional Rankine cycle, but thermal efficiencies of the evaporator and condenser are lowered, so that there is a disadvantage of cancelling the increased thermal efficiency with the saving cost. Moreover, the whole amount of mixed vapor is passed through a condenser, an area of the condenser becomes larger than the ranking cycle, a flow rate of the low heat source increases, the cost for constructing a generator becomes high, and power for sending a low heat source and a high heat source becomes large, so that this cycle is not economically advisable.

SUMMARY OF THE INVENTION

An object of the present invention is to obviate the above-described conventional shortcomings and to provide a thermal power generator which improves power generation efficiency, reduces equipment cost, and reduces electric power for pumping up a high heat source and a low heat source.

The present invention relates to a thermal power generator comprising an evaporator for heat-exchanging between a high heat source fluid supplied from a high heat source pump and a cold working fluid supplied from a cold working fluid pump and a main condensation tank for supplying a low heat source fluid connected to a low heat source pump, a liquid-vapor separator connected to the evaporator, a pair of turbines and generators connected to the separator, an absorber connected to the latter stage of the turbine for heat-exchanging a regenerated working fluid, a regenerator for receiving a liquid separated in the separator and heat-exchanging the liquid with a cold-working fluid, a pipe system having a reducing pressure valve for sending the regenerated fluid of the regenerator to the absorber and heat-exchanging it, a heater for heat-exchanging a discharge fluid of the first stage turbine with a cold-working fluid, a tank for temporarily storing the discharge fluid from the heater for supplying it to the cold working fluid pump, an auxiliary condensation tank connected to the main condensation tank and the absorber, a storage tank connected to the auxiliary condensation tank for storing a cold-working fluid from a low heat source, and a pipe line having a pump for feeding the cold-working fluid to the heater, regenerator and evaporator, wherein a fluid evaporated and vaporized the cold-working fluid by the high-heat source fluid is liquid-vapor separated by the separator, only the high-heat vaporized working fluid is sent to the turbine, at least two stages of a generating system are provided, and the cold-working fluid recondensed the discharge fluid from the final stage turbine heat-exchanged with the cold-working fluid by the absorber and main condensation tank is circulated through the cooling pipe line.

The thermal power generator mentioned in the present invention is a power generating system using as a high heat source warm sea water at high temperature in an oceanic device, hot spring water, subterranean heat water and steam pumped from underground, warm drain, steam and warm water gas discharged from a thermal-power station and an atomic power stain, warm drain and warm exhaust gas of a refuse incinerator and a sewage disposal plant, and a cooling water of an atomic reactor, and as a low heat source a cooling sea water at low temperature in a deep layer of the ocean, water cooled at a cooling tower, water of an oceanic surface layer, river water, ground water, LNG, LPG and the like.

The present invention plans economical thermal power generation by improving power generation efficiency of

3 such thermal power generator, improving thermal efficiencies of an evaporator and a condenser, and reducing cost for constructing an apparatus.

BRIEF DESCRIPTION OF THE ATTACHED DRAWING

For a better understanding of the invention, reference is made to the accompanying drawings, in which;

FIG. 1 is a block diagram showing one example of the construction for carrying out the present invention.

1 is a high heat source pump, 2 and 3 are working fluid pumps, 4 is a low heat source pump, 5 and 6 are generators, 7 is a reducing valve, 8 is an evaporator, 9 is a separator, 10 and 14 are turbines, 11 is a regenerator, 12 is a heater, 13 is a heat seal jacket, 15 is an absorber, 16 is a main condenser, 17 is an auxiliary condensation tank, 18 is a tank, 19 is a storage tank, 20 and 21 are branches.

DETAILED DESCRIPTION OF THE INVENTION

Figure 1:
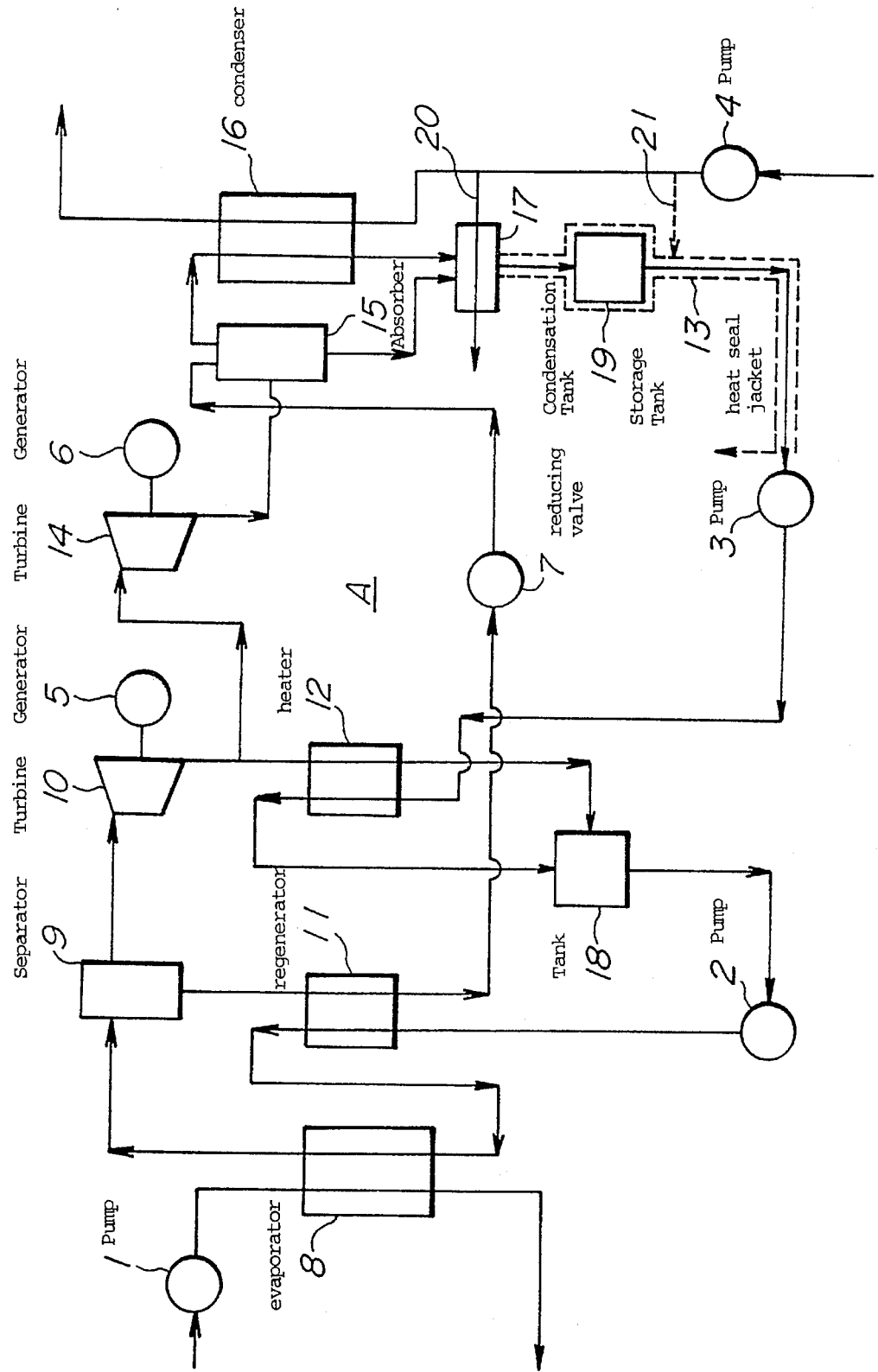

An embodiment of the present invention will be explained by referring to the accompanying drawing in detail as follows.

A thermal power generator having a construction shown in FIG. 1 comprises a high heat source pump 1, an evaporator 8 connected to said high heat source pump 1, and a cold working fluid pump 2 for evaporating a cold working fluid. A separator 9 is connected to said evaporator 8, a regenerator 11 and turbine 10, for separating a vapor and a liquid. Regenerator 11 is connected to separator 9 and cold working fluid pump 2. A first stage turbine 10 is connected to separator 9 and with a generator 5, a heater 12 and a second stage turbine 14. Heater 12 is connected to first stage turbine 10 and a cold working fluid pump 3 for heat exchanging cold working fluid and the delivery of first stage turbine 10. A second stage turbine 14 is connected to first turbine 10, with a generator 6. An absorber 15 is connected to second stage turbine 14, a main condensation tank 16, an auxiliary condenser tank 17 and a reducing pressure valve 7. High heat source pump 1 is connected to evaporator 8, and low heat source pump 4 is connected to main condensation tank 16. Working fluid pumps 2 and 3 are in communication with each other, and are connected through piping and valve.

The present invention is described in more detail. An evaporator 8 is connected to a high heat source pump 1. A high heat source fluid is supplied from the high heat source pump 1, and is heat-exchanged with a cold-working fluid sent from a low heat source working pump 2 so as to make the working fluid a vapor-liquid mixture. The mixture is sent to a separator 9 connected to the evaporator 8 and separated into vapor and liquid. The separated vapor is sent to a turbine 10, and power is generated by rotating the turbine 10 and a generator 5 connected thereto. The vapor discharged from the first stage turbine 10 is of high temperature and high pressure, so that it is sent to a next stage turbine 14 to generate power by rotating a generator 6 connected to the turbine 14. On the other hand, the liquid obtained by vapor-liquid separating in the separator 9 is still at high temperature, so that it is sent to a regenerator 11. Cold-working fluid is sent from a working fluid pump 2 to the regenerator 11, and the warmed working fluid is sent to the evaporator 8 and heat-exchanged with a high heat source fluid sent from the high heat source pump 1. Moreover, piping is arranged in such a manner that a part of the vapor discharged from the first stage turbine 10 is branched,

4 guided to a heater 12, and heat-exchanged with a cold-working fluid sent from a working fluid pump 3. The vapor is cooled by heat-exchange and condensed in the heater 12, and a working fluid warmed by heat-exchange are stored in a tank 18, and the stored fluid is sent to the regenerator 11 by the working fluid pump 2 connected to the tank 18. The vapor discharged from second stage turbine 14 is guided to an absorber 15, mixed with a fluid sent from the regenerator 11 via a reducing valve 7, and the absorbed liquid is sent to an auxiliary condensation tank 17, further condensed to low temperature, and sent to a low heat source fluid storage tank 19. A low heat source fluid is sent to the heater 12 by the working fluid pump 3 connected to the storage tank 19 and heat-exchanged. The vapor discharged from the absorber 15 is sent to the main condensation tank 16 and heat-exchanged with the low heat source fluid sent from the low heat source pump 4. The resulting liquid is sent to the auxiliary condensation tank 17. The low heat source fluid sent from the low heat source pump 4 is branched by a branch 20, guided to the auxiliary condensation tank 17, and heat-exchanged here, and the cooled working fluid is stored in the storage tank 19. Piping is arranged to send the cold working fluid to the heater 12 by the working fluid pump 3 connected to the tank 19. Reference numeral 13 shows a heat seal jacket provided in the piping system around fluid storage tank 19. Reference numerals 20, 21 show branches for branching the piping system from the cold heat source pump 4 to the main condensation tank 16.

In carrying out the present invention, it is further effective to provide not single but a plurality of evaporators 8 and main condensation tank 16. Moreover, it is effective to provide two or more sets of turbines 10, 14 and heaters 12, in addition to those in the illustrated embodiment.

In the illustrated embodiment, the working fluid used in the present invention is a working fluid consisting of a mixture of 2 to 3 components having different boiling points, and this working fluid is sent to regenerator 11 by a working fluid pump 2 from a tank 18. The cold working fluid is heated by a mixed liquid separated by a separator 9 in the regenerator 11, thereafter heated in an evaporator 8 by a high temperature fluid sent by high heat source pump 1, boiled and evaporated. With such a structure, some foams are generated in the regenerator 11 for increasing thermal conductivity efficiency of evaporator 8. In this case, temperature and pressure of the mixture increases with heating within the evaporator 8. The working fluid of the mixture reaches a separator 9 in the admixed condition of a vapor portion and a liquid portion.

As a preferable example of the working fluid, mention may be made of water added to ammonia and FLON 32, i.e., fluorinated hydrocarbon ($CH_2F_2$) to FLON 134a, i.e., fluorinated hydrocarbon ($CH_2FCF_3$). Moreover, under the condition of a high heat source and a low heat source, it is sometimes effective to add FLON 32 and FLON 123, i.e., chlorinated fluorinated hydrocarbon ($CHCL_2CF_3$) to FLON 134a, respectively. Furthermore, it is practically possible to combine hydrocarbon compounds having different boiling points.

In the embodiment of the present invention, ammonia and FLON 134a are called material A, and water and FLON 32 are called material B.

In the separator 9, the mixed vapor containing many components of material A is separated from the mixed liquid containing many component of material A. The mixed vapor containing many components of material A reaches a turbine 10, expands by passing therethrough, drives the turbine, and thereafter rotates a generator 5 for generating power. The mixed vapor exited from the turbine 10 is separated into two branches, with one branch passing through turbine 14, and the other branch passing through heater 12 at the exit. This separating ratio is determined according to a theory for maximizing power generator efficiency. By separating the vapor into a suitable ratio, an amount of the mixed vapor transmitted to a main condensation tank 16 can more considerably be reduced than a ranking cycle and a calina cycle. It is thereafter possible to reduce a heat transfer area of the main condensation tank 16 and an amount of cooling source for cooling.

The mixed vapor reached the turbine 14 rotates a generator 6 for generating power and thereafter passes through the turbine 14 and reaches an absorber 15.

On the other hand, the mixed liquid separated by the separator 9 heats a low temperature mixed liquid sent from a tank 18 by a pump 2 at a regenerator 11, is reduced to an appropriate pressure by a reducing valve 7, and sent to an absorber 15. The mixed liquid is mixed with the mixed vapor passed through the turbine 14 and absorbed. There, the mixed vapor, which is highly concentrated again, reaches the main condensation tank 16, and becomes a mixed liquid condensed by the low heat source fluid sent by the cold heat source pump 4.

Some of the mixed liquid remaining in the absorber 15 is sent to an auxiliary condenser 17 and further cooled. A mixed liquid condensed in the main condensation tank 16 and non-condensed mixed vapor reach an auxiliary condenser 17 and are completely condensed there, then reach a tank 19 and are stored there.

The mixed liquid stored in the tank 19 is sent to heater 12 by pump 3. There, part of the mixed vapor exited from the turbine 10 is condensed and thereafter sent to tank 18. On the other hand, the mixed vapor condensed by the heater 12 becomes a mixed liquid and reaches the tank 18.

The mixed liquid becomes a mixed liquid of the original concentration in the tank 18 and is sent to a regenerator 11 by a pump 2. The device of the present invention repeats such heating and cooling, and circulates a fluid to improve and economically establish power generation efficiency.

According to the present invention, when a low heat source fluid sent by a pump 4 is passed through an auxiliary condensation tank 17 and a seal jacket 13 of a tank 19 through connecting tubes 20, 21, heat is prevented from entering from the outside and the working fluid is prevented from re-evaporation.

An example of mixed fluids according to the present invention is mentioned as follows.
(1) Ammonia: water=90:10–80:20
(2) FLON 13A: FLON 32=80:20–90:10
The above mixing ratios are preferable.

As apparent from the above explanation, according to the present invention, in a thermal power generator, there is provided a two-stage type or a plurality of turbines. Additionally separator 9, regenerator 11 and absorber 15, are present and further 1 one or a plurality of heaters 12, so that thermal energy held in a high heat source and a low heat source is converted into electrical energy with higher efficiency, a heat transfer area of a condensation tank 16 and a flow rate of a low heat source are reduced, and thermal efficiency of an evaporator 8 is increased, which are industrially remarkable effects.

What is claimed is:

1. A thermal power generator comprising:

a high heat source pump supplying a high heat source fluid;

first and second cold working fluid pumps each pumping a cold working fluid;

an evaporator receiving the high heat source fluid from said high heat source pump, and a warmed working fluid, the high heat source fluid being heat-exchanged with the warmed working fluid to form a vapor-liquid working fluid;

a liquid-vapor separator connected to said evaporator and receiving the vapor-liquid working fluid therefrom, said liquid-vapor separator separating the vapor-liquid working fluid into a vapor working fluid and a liquid working fluid;

a first stage turbine and generator, said first stage turbine being connected to said liquid-vapor separator and receiving the vapor working fluid therefrom, said first stage turbine discharging the vapor working fluid received therein through two separate branches;

a second stage turbine and generator connected to said first stage turbine using one of the branches, and receiving a portion of the vapor working fluid discharged from said first stage turbine, said second stage turbine discharging the vapor working fluid received therein;

a heater connected to said first stage turbine using the other one of the branches, and receiving the remaining vapor working fluid discharged from said first stage turbine, said heater further receiving the cold-working fluid from said second cold working fluid pump, the remaining vapor working fluid being heat-exchanged with the cold working fluid to warm the cold working fluid, and cool and condense the remaining vapor working fluid, said heater discharging the working fluids received therein;

a tank for temporarily storing and mixing the working fluids discharged from said heater to form a stored working fluid, and supplying the stored working fluid to said first cold working fluid pump;

a regenerator receiving the liquid working fluid from said separator, and the cold working fluid from said first cold working fluid pump, said regenerator heat-exchanging the liquid working fluid with the cold-working fluid to change the liquid working fluid into a regenerated working fluid, and the cold working fluid into the warmed working fluid, the warmed working fluid being discharged to said evaporator;

an absorber connected to said second stage turbine and said regenerator for heat-exchanging and mixing the regenerated working fluid with the vapor working fluid received from said second stage turbine, said absorber discharging the vapor working fluid, and an absorbed working fluid;

a reducing valve interposed between said regenerator and said absorber;

a low heat source pump supplying a low heat source fluid;

a main condensation tank receiving the low heat source fluid from said low heat source pump, and the vapor working fluid discharged from said absorber, the low heat source fluid being heat-exchanged with the vapor working fluid discharged from said absorber to recondense the vapor working fluid therein to form a recondensed working fluid;

an auxiliary condensation tank receiving the absorbed working fluid discharged from said absorber, and the recondensed working fluid discharged from said main condensation tank, and receiving the low heat source fluid to cool the absorbed working fluid and the recondensed working fluid to form the cold-working fluid;

a storage tank connected to said auxiliary condensation tank for storing the cold-working fluid; and means for supplying the cold working fluid from said storage tank to said second cold working fluid pump.

2. A thermal power generator comprising:

a high heat source pump supplying a high heat source fluid;

first and second cold working fluid pumps each pumping a cold working fluid;

an evaporator receiving the high heat source fluid from said high heat source pump, and a warmed working fluid, the high heat source fluid being heat-exchanged with the warmed working fluid to form a vapor-liquid working fluid;

a liquid-vapor separator connected to said evaporator and receiving the vapor-liquid working fluid therefrom, said liquid-vapor separator separating the vapor-liquid working fluid into a vapor working fluid and a liquid working fluid;

a turbine and generator, said turbine being connected to said liquid-vapor separator and receiving the vapor working fluid therefrom, said turbine discharging the vapor working fluid received therein through two separate branches;

a heater connected to said turbine using one of the branches, and receiving a portion of the vapor working fluid discharged from said turbine, said heater further receiving the cold-working fluid from said second cold working fluid pump, the vapor working fluid being heat-exchanged with the cold working fluid to warm the cold working fluid, and cool and condense the vapor working fluid, said heater discharging the working fluids received therein;

means for storing and mixing the working fluids discharged from said heater to form a stored working fluid, and supplying the stored working fluid to said first cold working fluid pump;

a regenerator receiving the liquid working fluid from said separator, and the cold working fluid from said first cold working fluid pump, said regenerator heat-exchanging the liquid working fluid with the cold-working fluid to change the liquid working fluid into a regenerated working fluid, and the cold working fluid into the warmed working fluid, the warmed working fluid being discharged to said evaporator;

an absorber connected to said turbine using the other one of the branches, and to said regenerator for heat-exchanging and mixing the regenerated working fluid with the remaining vapor working fluid received from said turbine;

a low heat source pump supplying a low heat source fluid;

condensation means connected to said absorber, and receiving the low heat source fluid from said low heat source pump for forming the cold-working fluid;

a storage tank connected to said condensation means for storing the cold-working fluid; and means for supplying the cold working fluid from said storage tank to said second cold working fluid pump.

3. The generator defined in claim 2, further comprising an additional turbine and generator connected to the other turbine, and being interposed between the other turbine and said absorber for receiving the remaining vapor working fluid through the other one of the branches, and discharging the remaining vapor working fluid received therein to said absorber.

4. The generator defined in claim 2, further comprising a reducing valve interposed between said regenerator and said absorber.

5. The generator defined in claim 2, wherein said absorber discharges the vapor working fluid and an absorbed working fluid.

6. The generator defined in claim 5, wherein said condensation means comprises:

a main condensation tank receiving the low heat source fluid from said low heat source pump, and the vapor working fluid discharged from said absorber, the low heat source fluid being heat-exchanged with the vapor working fluid discharged from said absorber to recondense the vapor working fluid therein to form a recondensed working fluid; and an auxiliary condensation tank receiving the absorbed working fluid discharged from said absorber, and the recondensed working fluid discharged from said main condensation tank, and receiving the low heat source fluid to cool the absorbed working fluid and the recondensed working fluid to form the cold-working fluid.

\* \* \* \* \*